United States Patent [19]

Umehara et al.

[11] 4,077,244

[45] Mar. 7, 1978

[54] METHOD OF AND APPARATUS FOR CONTINUOUSLY WINDING A RECTANGULAR WIRE

[75] Inventors: Noboru Umehara; Hidetoshi Takeshita, both of Hitachi, Japan

[73] Assignee: Hitachi, Ltd., Japan

[21] Appl. No.: 723,970

[22] Filed: Sep. 16, 1976

[51] Int. Cl.² .............................................. B21D 7/04
[52] U.S. Cl. ..................................... 72/129; 72/134; 72/148; 72/294
[58] Field of Search ................. 72/129, 142, 149, 152, 72/203, 217, 294, 324, 340, 146, 148, 156, 159, 134, 426; 29/605

[56] References Cited

U.S. PATENT DOCUMENTS

| 1,656,003 | 1/1928 | Johnston | 72/324 |
| 2,382,901 | 8/1945 | Newsome et al. | 72/219 |
| 3,283,399 | 11/1966 | Hart et al. | 29/605 |
| 3,608,347 | 9/1971 | Kemminer | 72/142 |
| 3,698,228 | 10/1972 | Campbell | 72/306 |

*Primary Examiner*—Michael J. Keenan
*Attorney, Agent, or Firm*—Craig & Antonelli

[57] ABSTRACT

An apparatus for continuously winding a rectangular wire, or a strip metal comprising a coil former consisting of upper and lower former members adapted to cooperate with each other for clamping the strip metal and arranged to be rotatable independently of each other, an arm for clamping and bending the strip metal to shape same to the profile of the coil former, a cutting blade secured to the upper former member and adapted to cut protrusion on the strip metal upon rotation of the upper former member, which protrusions result from the bending of the strip metal, and an extraction cylinder for clamping and extracting the bent strip metal from the coil former.

17 Claims, 8 Drawing Figures

METHOD OF AND APPARATUS FOR CONTINUOUSLY WINDING A RECTANGULAR WIRE

BACKGROUND OF THE INVENTION

The present invention relates to an apparatus for producing stator cores or stator coils of electric machines such as generators or motors and, more particularly, to an apparatus for automatically producing stator cores or coils by continuously plastic working a strip metal in a substantially spiral form.

Conventionally, stator cores or stator coils (Hereinafter, only the stator core will be referred to representatively, and the stator coil will be neglected in the description, for the purpose of clarity.) have been fabricated by laminating a plurality of annular strip metals punched out from a sheet blank, or by first winding a strip metal around a core metal to form multiple layers, then cutting the coiled strip metal into a number of annular strip metals and finally laminating thus obtained annular strip metals in such a manner that the cut portions are not superimposed.

However, the first mentioned method employing the punching process is disadvantageous in that considerable part of the sheet blank is inevitably wasted. The second method has been found also to be unsatisfactory, although it can afford an enhanced yield as compared with the first method due to the fact that the outer portion of the annular strip metal is subjected to a tensile force, while the inner portion is compressed, so that wrinkles or corrugation are produced at the radially inner portion. These wrinkles irregularly increase the thickness of the annular strip metal and can be corrected through troublesome efforts employing a press. In addition, both of the conventional measures described above require manual labor, thus presenting inefficiency.

In order to eliminate these disadvantages, a variety of machines or apparatus have been proposed for subjecting a strip metal to plastic working while applying a predetermined lateral pressure on and constraining the strip metal at the outer edge thereof. However, these apparatus are unacceptably large in size and complicated in construction, and provide unsatisfactory accuracy in thickness of the strip metal which has been subjected to plastic working.

SUMMARY OF THE INVENTION

The apparatus of the present invention has a feature in removing protrusions formed on the strip metal due to plastic working and in providing an improved thicknesswise dimensional accuracy.

The present invention has an advantage in that the apparatus constructed in accordance with the present invention is small-sized and simple in structure due to the fact that a cutter for removing the protrusions from the worked strip metal is integrally mounted on an upper former member of the coil former and an arm for clamping and subjecting the strip metal to plastic working is arranged to be rotated about the axis of the coil former. In addition, the provision of notches in the coil former facilitates the removal of the worked or coiled product from the continuous winding apparatus.

It is therefore an object of the present invention to provide a continuous winding apparatus, in which a strip metal is subjected to plastic working to provide a product of an enhanced thicknesswise dimensional accuracy.

It is another object of the present invention to provide a continuous winding apparatus which is small-sized and simple in construction.

A further object of the present invention is to provide a continuous winding apparatus in which the resulting product can be removed from a coil former.

A still further object of the present invention is to provide a method of continuously winding a strip metal.

It is a still further object of the present invention to provide a method for automatically winding a strip metal with a high dimensional accuracy.

These and other objects, as well as the advantageous features of the invention, will be apparent from the following detailed description and the accompanying drawings, wherein.

DETAILED DESCRIPTION

The invention will be more fully understood from the following description of a preferred embodiment in conjunction with the attached drawings.

Figure 1:
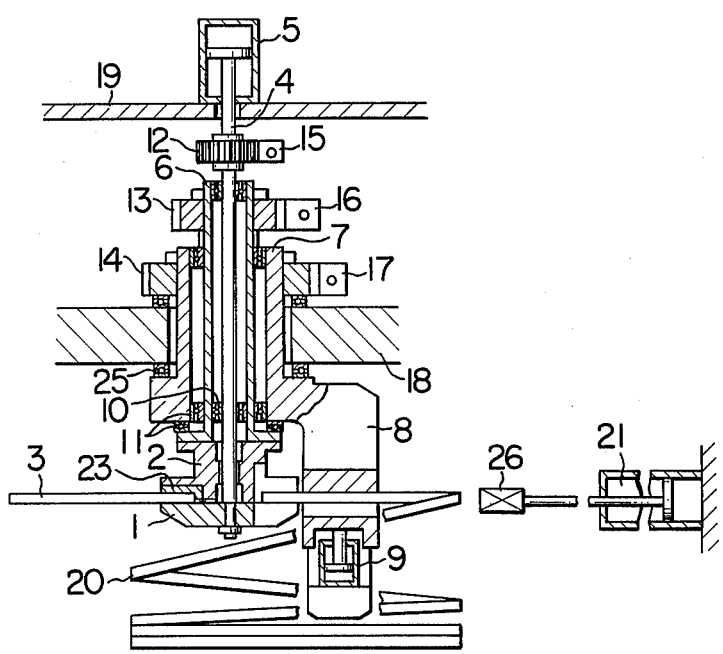
FIG. 1 shows partially in section a side elevation of an apparatus for continuously winding a strip metal in accordance with the present invention.

Referring to FIG. 1, a strip metal, that is, a rectangular wire 3 is clamped between an upper former member 2 and a lower former member 1 of a coil former. The lower former member 1 is connected through a lower former member shaft 4 to a piston of a former clamp cylinder 5 mounted on a support plate 19, and serves to clamp or release the rectangular wire 3 in cooperation with the upper former member 2.

A toothed wheel or gear 12 is secured to the lower former member shaft 4 below the support plate 19 by suitable means such as a key, for engagement with a rack 15 so as to be driven thereby. The rack 15 in turn is adapted to be driven by a suitable hydraulic cylinder (not shown).

The upper former member 2 is secured to a hollow shaft 6 by bolts, which shaft 6 in turn is journaled by the lower former member shaft 4 through the medium of bearings 10.

A gear 13 is keyed to the hollow shaft 6 at the top portion thereof for engagement with a rack 16 which in turn is carried by the frame of the apparatus and is actuated by a suitable hydraulic cylinder (not shown) to drive the gear 13. The hollow shaft 6 is journaled by a hollow arm shaft 7 through bearings 11, which shaft 7 in turn is rotatably carried by the frame 18 through thrust bearings 25. The arm shaft 7 secures at its upper portion a pinion gear 14 by a key, which gear is adapted to engage with a rack 17 actuated by a suitable hydraulic cylinder (not shown) and carried by the frame.

A C-shaped arm 8 is integrally formed with the arm shaft 7 and carries a rectangular wire clamp cylinder 9. An extraction cylinder 21 is secured to the frame and has a piston rod which mounts thereon an extraction clamp cylinder 26 for clamping the bent portion of the rectangular wire 3.

The rectangular wire 3 is successively bent and formed into a spiral coil 20, as shown in FIG. 1, which process is shown in FIG. 2.

Referring to FIG. 2, the upper and lower former members 2 and 1 have respective notches 22 of the same shape and size. The upper former member 2 secures a cutting edge or blade 23 at one of its radial edges defining the notches 22, which blade 23 serves to cut and remove protrusions 24 which are produced at the inner bent portions of the rectangular wire.

In operation, the rectangular wire 3 is interposed between the upper and lower former members 2 and 1, and then is clamped therebetween when the lower former member 1 is drawn toward the upper former member 2 by the former clamp cylinder 5.

Figure 2A:
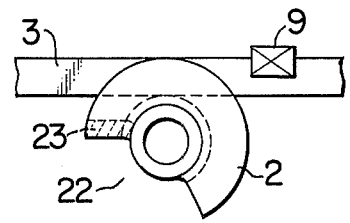
FIGS. 2A to 2F show the steps in which the strip metal is being bent.

Thereafter the rectangular wire 3 is clamped at the portion near the coil former by the rectangular wire clamp cylinder 9 provided at the end of the bending arm 8, as shown in FIG. 2A. Then, a hydraulic cylinder (not shown) is actuated to drive the rack 17 which in turn rotates the gear 14 so as to swing the arm shaft 7 and, accordingly, the bending arm 8 through 90°, as shown in FIG. 2B.

During the swinging movement of the arm 8 the rectangular wire 3 remains clamped by the rectangular wire clamp cylinder 9, so that the wire is forcibly bent at the portion interposed between the upper and lower former member 2 and 1 to produce protrusions at its radially inner portion. The upper and lower former members remains stationary during the bending of the rectangular wire 3 from the position of FIG. 2A to that of FIG. 2B.

For removing the resulting protrusions 24 by cutting, the rack 16 is actuated by its associated hydraulic cylinder (not shown) to rotate the upper former member 2 counter-clockwise through 360° with the rack 15 and thus the lower former members 1 being kept stationary. The rotation of the upper former member 2 causes the cutting blade 23 to cut the protrusions 24, as seen from FIGS. 2C and 2D.

Figure 2B:
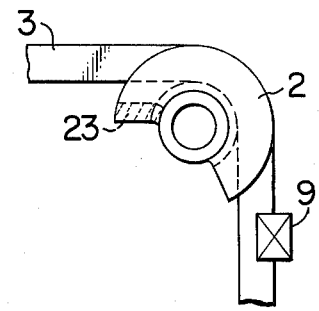
Figure 2C:
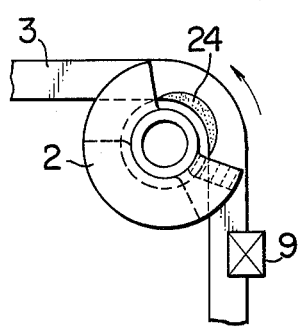
Figure 2D:
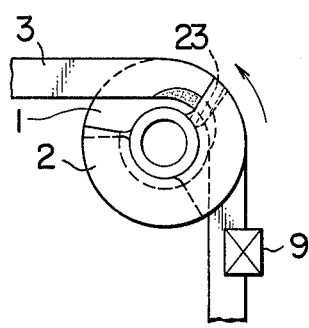
Figure 2E:
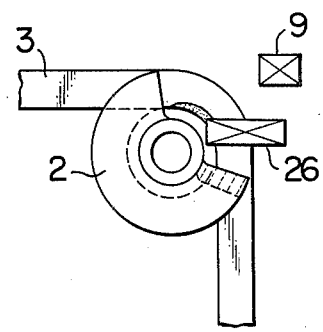
Figure 2F:
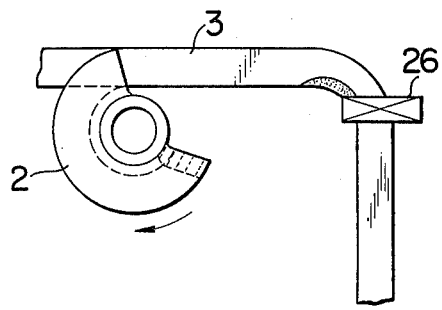

Then, the hydraulic cylinder associated with the rack 16 is reversely actuated to move the rack 16 in the counter direction so as to rotate the upper former member 2 clockwise through 360°, so that the upper former member 2 reaches the position as shown in FIG. 2B. It is to be noted that the protrusion 24 has already been removed at this stage. The racks 15 and 16 then are simultaneously actuated to rotate the upper and lower former members 2 and 1 counter-clockwise through 180°, so that the members reach the position as shown in FIG. 2E. At the position the bent portion of the rectangular wire is positioned in the notches 22. Thereafter, the rectangular wire clamp cylinder 9 is reversely actuated to release the rectangular wire 3, after which the rack 17 is reversely actuated to cause the counter-clockwise rotation by 90° of the gear 14, arm shaft 7 and bending arm 8, so that the rectangular wire clamp cylinder 9 is returned to the position as shown in FIG. 2A. Then, the piston of the extraction cylinder 21 is advanced toward the rectangular wire, and thereafter the extraction clamp cylinder 26 is actuated to clamp the rectangular wire at the bent portion thereof positioned in the notched portion 22, as shown in FIG. 2E.

After the former clamp cylinder 5 is reversely actuated to unclamp the rectangular wire between the upper and lower former members 2 and 1, the extraction cylinder 21 is retracted, so that the rectangular wire 3 is drawn out from the coil former to the position as shown in FIG. 2E.

Simultaneously, the racks 15 and 16 are driven to rotate the respective gears 12, 13 and shafts 4, 6 counter-clockwise through 180° to the position as shown in FIG. 2A.

Figure 2G:
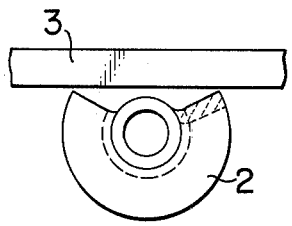
FIG. 2G shows a position of a coil former when the same is disengaged from the worked strip metal.

Above described operation is repeated for successive winding of the rectangular wire 3. When the rectangular wire 3 is to be removed from the coil former, the upper and lower former members 2 and 1 are rotated such that the notches 22 are positioned in faced relation to the rectangular wire 3, as shown in FIG. 2G to permit the wire to be freed from the former members.

It will be seen from the foregoing description that, according to the invention, the continuous winding or coiling of a rectangular wire can be automatically performed and that the removal of the coiled rectangular wire from the coil former is facilitated. In addition, the apparatus can be small-sized considerably as compared with conventional apparatus. Furthermore, the rectangular wire is removed from the coil former with the bent portion being clamped, so that the coiled rectangular wire is subjected to little deformation, thereby improving the dimensional accuracy of the product.

Although a specific embodiment has been described for the purpose of illustration, it is to be understood that various changes and modifications can be made without departing from the spirit of the invention which is limited solely by the appended claims.

What is claimed is:

1. An apparatus for continuously winding a strip metal comprising a coil former for clamping said strip metal, said coil former comprising upper and lower former members being formed with notches, means for clamping and bending said strip metal to shape the same to the profile of said coil former, means mounted on the coil former for cutting protrusions which have been produced at the inner side portion of said strip metal due to bending, and means for pulling the bent strip metal out of said coil former.

2. An apparatus as set forth in claim 1, wherein said bending means are disposed to be rotatable around the axis of rotation of said coil former.

3. An apparatus as set forth in claim 2, wherein said bending means includes means for clamping said strip metal.

4. An apparatus as set forth in claim 1, wherein said pulling means includes means for clamping said strip metal at the bent portion thereof.

5. An apparatus as set forth in claim 4, wherein said clamping means of said pulling means engages said bent portion at said notches.

6. An apparatus as set forth in claim 1, wherein said cutting means is secured to said upper former member.

7. An apparatus as set forth in claim 1, further comprising a clamp cylinder connected to said lower former member for drawing the same toward and away from said upper former member.

8. An apparatus as set forth in claim 1, wherein said upper and lower former members clamp said strip metal therebetween.

9. An apparatus as set forth in claim 8, wherein said upper and lower former members are independently rotatable.

10. An apparatus as set forth in claim 9, wherein said cutting means is secured to said upper former member.

11. An apparatus as set forth in claim 9, wherein said pulling means includes means for clamping said strip metal at the bent portion thereof.

12. An apparatus as set forth in claim 11, wherein said clamping means of said pulling means engages said bent portion at said notches.

13. In an apparatus for continuously winding strip metal comprising coil forming means for shaping said strip metal into a coil, bending means for bending said strip metal about said coil forming means to form said coil, cutting means mounted on said coil forming means for cutting protrusions from said coil, and extraction means for clamping and extracting said coil from said coil forming means, the improvement comprising said coil forming means including a pair of gripping means for gripping said strip metal, said pair of gripping means being independently rotatable about an axis of rotation and having respective notches relative to said strip metal, wherein one of said pair of gripping means is provided with said cutting means at a notch edge so that rotation of said one gripping means will remove protrusions on said strip metal at the bend portion of said coil, and wherein said extracting means is inserted into said notches of said pair of gripping means to clamp said coil at said bend portion and to extract said coil from said pair of gripping means.

14. An apparatus according to claim 13, wherein said bending means includes clamping means for clamping said strip metal adjacent said pair of gripping means of said coil forming means, said bending means being rotatable about said axis of rotation of said gripping means to effect said bending of said strip metal.

15. A method for continuously winding a strip metal comprising the steps of gripping said strip metal between a pair of upper and lower members of a coil former, bending said strip metal to shape the same to the profile of said coil former, cutting protrusions formed on said strip metal by means of cutting means provided on the coil former, said protrusions being produced during said bending, and pulling the bent strip metal out of said coil former.

16. A method as set forth in claim 15, wherein said coil former is rotatable about an axis upon cutting.

17. An apparatus for continuously winding a strip metal comprising a coil former for clamping said strip metal, means for clamping and bending said strip metal to shape same to the profile of said coil former, means mounted on the coil former and for cutting protrusions which have been produced at the inner side portion of said strip metal due to the bending, and means for pulling the bent strip metal out of said coil former, wherein said bending means are disposed to be rotatable around the axis of rotation of said coil former, and wherein said bending means includes means for clamping said strip metal.

* * * * *